United States Patent
Kusano et al.

(10) Patent No.: US 7,113,456 B2
(45) Date of Patent: Sep. 26, 2006

(54) METHOD AND APPARATUS FOR PLAYING BACK A MULTISESSION DISC

(75) Inventors: Manabu Kusano, Iwaki (JP); Shinji Wakabayashi, Iwaki (JP); Masamichi Matsuoka, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 484 days.

(21) Appl. No.: 10/390,458

(22) Filed: Mar. 17, 2003

(65) Prior Publication Data

US 2004/0032771 A1 Feb. 19, 2004

(30) Foreign Application Priority Data

Mar. 22, 2002 (JP) ............................. 2002-080277

(51) Int. Cl.
*G11B 21/08* (2006.01)
(52) U.S. Cl. .................................. 369/30.09; 369/30.23
(58) Field of Classification Search .................. None
See application file for complete search history.

(56) References Cited

U.S. PATENT DOCUMENTS

| | | | | |
|---|---|---|---|---|
| 5,410,525 A | * | 4/1995 | Yokota | 369/30.23 |
| 6,320,827 B1 | * | 11/2001 | Otsuka | 369/30.06 |
| 6,425,018 B1 | | 7/2002 | Kaganas et al. | 710/1 |
| 6,510,127 B1 | * | 1/2003 | Kim | 369/275.2 |
| 6,621,777 B1 | * | 9/2003 | Lee | 369/47.24 |
| 2002/0126552 A1 | * | 9/2002 | Jeong | 365/200 |
| 2003/0002417 A1 | * | 1/2003 | Takeshi | 369/59.13 |

* cited by examiner

*Primary Examiner*—Thang V. Tran
*Assistant Examiner*—Christopher Lamb
(74) *Attorney, Agent, or Firm*—Brinks Hofer Gilson & Lione

(57) ABSTRACT

A method and apparatus for reading multisession discs in which both standard CD-DA format and compressed music formats, such as MP3, may be utilized on the same disc. High speed reading of data into shock proof memory, analysis of available memory and storage of analyzed record structures are used to provide playback of music in both formats and, if desired, in a random playback order.

12 Claims, 16 Drawing Sheets

FIG. 10

| MNR | LARGE FRAME No. | POINT | PMIN, PSEC, PFRAME | |
|---|---|---|---|---|
| 00 | n | 01 | 00.02.32 | |
| ↓ | n+1 | 01 | 00.02.32 | |
|  | n+2 | 01 | 00.02.32 | |
|  | n+3 | 02 | 10.15.12 | |
|  | n+4 | 02 | 10.15.12 | |
|  | n+5 | 02 | 10.15.12 | |
|  | n+6 | 03 | 16.28.63 | |
|  | n+7 | 03 | 16.28.63 | |
|  | n+8 | 03 | 16.28.63 | |
|  | n+9 | 04 | . . | |
|  | n+10 | 04 | . . | |
|  | n+11 | 04 | . . | |
|  | n+12 | 05 | . . | |
|  | n+13 | 05 | . . | |
|  | n+14 | 05 | . . | |
|  | n+15 | 06 | 49.10.03 | |
|  | n+16 | 06 | 49.10.03 | |
|  | n+17 | 06 | 49.10.03 | |
|  | n+18 | A0 | 01.00.00 | } MNR OF FIRST SONG IN DISK |
|  | n+19 | A0 | 01.00.00 | |
|  | n+20 | A0 | 01.00.00 | |
|  | n+21 | A1 | 06.00.00 | } MNR OF LAST SONG IN DISK |
|  | n+22 | A1 | 06.00.00 | |
|  | n+23 | A1 | 06.00.00 | |
|  | n+24 | A2 | 52.48.41 | } START POINT OF LEAD-OUT TRACK |
|  | n+25 | A2 | 52.48.41 | |
| 00 | n+26 | A2 | 52.48.41 | |
| 00 | n+27 | 01 | 00.02.32 | } REPEAT |
| | n+28 | 01 | 00.02.32 | |
|  | . | . | . . | |
|  | . | . | . . | |
|  | . | . | . . | |

FIG. 13A

ISO9660 VOLUME

| VOLUME DESCRIP- TOR | PATH TABLE | DIREC- TORY | (DATA) | DIREC- TORY |
|---|---|---|---|---|

FIG. 13B

STRUCTURE OF BASIC VOLUME DESCRIPTOR

| BYTE | DATA | BYTE | DATA |
|---|---|---|---|
| 1 | TYPE OF VOLUME DESCRIPTOR ("1" IN CASE OF PVD) | 157 – 190 | DIRECTORY RECORD FOR ROOT DIRECTORY |
| 2 – 6 | STANDARD IDENTIFIER ("CD001") | 191 – 318 | VOLUME SET IDENTIFIER |
| 7 | NUMBER OF VOLUME DESCRIPTORS | 319 – 446 | PUBLISHER IDENTIFIER |
| 8 | UNUSED | 447 – 574 | DATA EDITOR IDENTIFIER |
| 9 – 40 | SYSTEM IDENTIFIER | 575 – 702 | APPLICATION SYSTEM IDENTIFIER |
| 41 – 72 | VOLUME IDENTIFIER | 703 – 739 | COPYRIGHT FILE IDENTIFIER |
| 73 – 80 | UNUSED | 740 – 776 | ABSTRACT FILE IDENTIFIER |
| 81 – 88 | SIZE OF VOLUME SPACE | 777 – 813 | BIBLIOGRAPHIC FILE IDENTIFIER |
| 89 – 120 | UNUSED | 814 – 830 | DATE AND TIME OF VOLUME GENERATION |
| 121 – 124 | SIZE OF VOLUME SET | 831 – 847 | DATE AND TIME OF VOLUME UPDATE |
| 125 – 128 | VOLUME SEQUENCE NUMBER | 848 – 864 | DATE AND TIME OF VOLUME LAPSE |
| 129 – 132 | LOGICAL BLOCK LENGTH | 865 – 881 | DATE AND TIME OF VOLUME ISSUE |
| 133 – 140 | SIZE OF PATH TABLE | 882 | NUMBER OF FILE STRUCTURES |
| 141 – 144 | POSITION OF L-TYPE LOGICAL PATH TABLE | 883 | (RESERVED) |
| 145 – 148 | POSITION OF ARBITRARY L-TYPE LOGICAL PATH TABLE | 884 – 1395 | FOR APPLICATION SYSTEM |
| 149 – 152 | POSITION OF M-TYPE LOGICAL PATH TABLE | 1396 – 2048 | (RESERVED) |
| 153 – 156 | POSITION OF ARBITRARY M-TYPE LOGICAL PATH TABLE | | |

TO Ⓐ

METHOD AND APPARATUS FOR PLAYING BACK A MULTISESSION DISC

BACKGROUND OF THE INVENTION

1. Field of the Invention

The present invention relates to a method for playing back a multisession disc. In particular, the present invention relates to a method for playing back a multisession disc in which music data of a CD-DA format is recorded in at least one session and compressed music data of another format is recorded in another session.

2. Description of the Related Art

One session corresponds to from the start to the end of a writing onto a recordable medium. A disc, such as a CD-R medium, which allows data to be written multiple times, may yield a multisession disc. FIG. 7 illustrates a multisession disc. In the multisession disc, each of added sessions includes a program area $P_1$, $P_2$, or $P_3$, and a lead-in area $LI_1$, $LI_2$, or $LI_3$ and a lead-out area $LO_1$, $LO_2$, or $LO_3$ sandwiching the program area. A volume descriptor (described later) and a path table of an added session and an already written session are recorded in each of the lead-in areas $LI_1$ to $LI_3$. Therefore, by reading the lead-in area of the last session, the file structure of the entire disc volume can be obtained.

Music data of various formats can be recorded in each session of the above-described multisession disc. For example, non-compressed music data can be recorded in a session in the CD-DA format (the same format as in an ordinary compact disc), and compressed music data can be recorded in another session in a CD-ROM mode 1 format. When an enhanced CD is used, CD-DA data is recorded in the first session and CD-ROM data (compressed music data) is recorded in the second session and subsequent sessions. Compressed music data may use MP3, WMA or other compression methods.

FIG. 8 illustrates a CD-DA signal format. The sample data of an acoustic signal has 6 samples of L and R channels (12 samples in total, one sample is 16 bits). The sample data is divided into 24 symbols, each of which having 8 bits. An 8-symbol correction code (CIRC) is added to the 24-symbol sample data so that 32 symbols form one unit. A frame synchronization signal and a sub-code are added to the 32-symbol unit to form one frame ((a) and (b) of FIG. 8). The 8 bit sub-code and each symbol are converted to 14 bits by EFM modulation. The frame synchronization signal has 24 bits. Further, a 3-bit junction bit is inserted between the individual symbols, whereby one frame has 588 bits.

98 frames form a large frame ((a) of FIG. 8). As shown in (c) of FIG. 8, the sub-code includes 8 bits of P, Q, R, S, T, U, V, and W. The sub-codes of the first two frames in the large frame are synchronization signals S0 and S1. Each of the sub-codes P, Q, R, S, T, U, V, and W includes 98 bits. Among them, the sub-code Q includes 2-bit synchronization data S0 and S1, 4-bit control data, 4-bit address data, 72-bit data, and 16-bit CRC data, as shown in FIG. 9.

The control data indicates whether a track is a 2-channel music track without pre-emphasis a 2-channel music track with pre-emphasis, or a normal data track. The track is a music track (CD-DA) if the second bit is 0 and is a data track if the second bit is 1. Thus, by referring to the control data of the sub-code Q in the lead-in area of each session, it can be determined whether the session is a CD-DA format session.

The 72-bit data packet specifies the song number, the elapsed time from the start of the song, the absolute time indicating the absolute current position with respect to the head of a program area with minute/second/frame, and so on. FIG. 9 shows the 72-bit data format in the lead-in area (TOC). (1) MNR is a song number (track number) and MNR=00 in the lead-in area. (2) POINT indicates the song number (track number) when the start of a song is indicated in TOC. (3) MIN/SEC/FRAME is the elapsed time from the start of a song. (4) ZERO indicates that all is 0. (5) PMIN/PSEC/PFRAME is the absolute position time in which the start of a song from the head of the program area is indicated with minute/second/frame, and corresponds to the index of a disc.

FIG. 10 illustrates the TOC in the lead-in area in case of CD-DA. The start of each song is repeatedly (three times) recorded at the MNR=00. For example, the start position of the song 01: 0 minute, 2 seconds, and frame 32, is indicated by the sub-code Q of the large frames Nos. n, n+1, and n+2, and the start position of the song 02: 10 minutes, 15 seconds, and frame 12, is indicated by the sub-code Q of the large frames Nos. n+3, n+4, and n+5. Further, POINT=A0 indicates the first song number in the disc, POINT=A1 indicates the last song number in the disc, and POINT=A2 indicates the head position of the lead-out area. In FIG. 10, the number of songs is 6.

FIG. 11 shows the structure of one sector in the CD-ROM mode 1. Herein, the signal format is the same as in CD-DA. Also, FIG. 12 is a diagram for comparing one sector of the CD-DA mode and one sector of the CD-ROM mode 1.

In the CD-ROM mode 1, the length of a sector is the same as that of the CD-DA mode, that is, 2352 (=24×98) bytes. One sector includes:

(1) synchronization signal data SKD of 12 bytes;
(2) header HDD of 4 bytes;
(3) user data USD of 2048 bytes; and
(4) auxiliary data EDCC of 288 bytes for error correction/detection.

Also, the sector includes 98 frames (one frame=24 bytes).

Among the 4 bytes of the header HDD, 3 bytes (MIN/SEC/SECTOR) corresponds to address information and 1 byte corresponds to mode information indicating the type of data. The address information is represented by minute/second/sector as in the sub-code of CD-DA and basically includes the same elements as in the Q channel. As in the signal format of the CD-DA, a synchronization signal, a sub-code, and an error-correcting code (CIRC) are added to each frame.

When data is recorded in a CD-ROM, data is compiled in one sector unit, a sub-code and a CIRC are added thereto as in the CD-DA, EFM modulation is performed so as to write the data, and the data is read from the CD-ROM in each sector by using the sub-code (absolute address of the Q-channel).

As described above, data in the CD-ROM includes a logical sector of 2048 bytes and includes logical blocks whose number is $2^n$ (n=0 in many cases). A volume space includes a system area and a data area. The system area occupies 16 sectors (logical sectors No. 0 to 15) from the head. In case of ISO9660, the data area includes a volume descriptor, a path table, a directory, and data, as shown in FIG. 13A. The volume descriptor includes a basic volume descriptor, a sub-volume descriptor, a volume block descriptor, etc.

As shown in FIG. 13B, the basic volume descriptor includes a volume identifier A0, a logical block length A1, the size of path table A2 for specifying the file structure (see FIG. 14), the position of the path table A3, and so on.

As shown in FIG. 13C, the path table includes a directory identifier (folder name) B1, the number of parent directory B2, and the record position (extent position) of the directory (file) constituting a directory (folder) B3. A plurality of path tables of a directory, whose parent directory is a root directory, are sequentially recorded.

As shown in FIG. 13D, the directory record includes a file identifier C1, a file start position (extent position) C2, date of file creation C3, the data length of a file C4, etc. The directory records of a plurality of files belonging to the directory (folder) are sequentially recorded.

FIG. 14 is an example of the file structure. The root directory includes a plurality of directories (folders: R&B, ROCK, JAZZ, POPS, etc.), the folder ROCK includes sub-folders ROCKMAN and ROCKWOMAN, the folder R&B includes a plurality of MP3 files (MP3 music files) RB-1, RB-2, etc. Likewise, each of the other folders includes several MP3 music files. This file structure can be obtained by analyzing the above-described basic volume descriptor, path table, and directory.

In CD-DA of the CD-DA format, the number and the position of songs can be recognized more easily than TOC information. Thus, sound can be quickly output when playback is performed. However, when a multisession disc, in which compressed music data of MP3 or the like is recorded in at least one session, is played back, it takes a long time for sound to be outputted. This is because the record structure (file structure) of each session must be analyzed to recognize the folders, file structure, and path structure, prior to commencement of playback. Thus, when compressed music data of MP3 or the like is recorded in the ISO9660 format, substantial time is required to analyze the record structure of the music data. The time for analysis becomes longer as the number of sessions increases. In this case, a delay ranging from several tens of seconds to one minute may be required for commencement of playback in a random playback as well as in a normal playback. Further, a silent state disadvantageously continues during that time.

Also, when a random playback is performed by using a CD changer, the record structure of music data of all sessions of all CDs must be analyzed. Thus, even more time is required for starting playback.

SUMMARY OF THE INVENTION

Accordingly, it is an object of the present invention to quickly output sound by shortening a silent time when a normal playback or a random playback is performed, even if non-compressed music data of the CD-DA format or MP3 compressed music data of the ISO9660 format is recorded in each session of multisessions.

It is another object of the present invention to quickly output sound by shortening a silent time even when music recorded in a plurality of discs in a CD changer is randomly played back.

According to a first embodiment of the present invention, a method for playing back a multisession disc in which music data of a CD-DA format is recorded in at least one session and compressed music data of another format is recorded in another session is provided. The method comprises the acts of: (1) searching for a session in which music data of the CD-DA format is recorded, reading the music data in the session from the disc at a high speed so as to write the music data in a shock proof memory, and reading the music data from the shock proof memory at a normal speed so as to play back the music data; (2) suspending reading of the music data from the disc every time the amount of music data in the shock proof memory reaches a first set value until the amount of data reaches a second set value, and meanwhile, analyzing the record structure of compressed music data recorded in other sessions so as to store the analysis result; and (3) playing back music in order based on the stored data when analysis of the record structure of all the sessions has been completed.

In this way, non-compressed music data of the CD-DA format is read and played back first, and meanwhile, the record structure of music data in other sessions is analyzed. Accordingly, the first song is always a CD-DA song, but playback can be rapidly started.

According to a second embodiment of the present invention, a method for playing back a multisession disc in which music data of a CD-DA format is recorded in at least one session and compressed music data of another format is recorded in another session is provided. The method comprises the acts of: (1) searching for a session in which music data of the CD-DA format is recorded when random playback is instructed, the playback order being randomly set in the random playback, reading the music data in the session from the disc at a high speed so as to write the music data in a shock proof memory, and reading the music data from the shock proof memory at a normal speed so as to play back the music data; (2) suspending reading of the music data from the disc every time the amount of music data in the shock proof memory reaches a first set value until the amount of data reaches a second set value, and meanwhile, analyzing the record structure of compressed music data recorded in other sessions so as to store the analysis result; and (3) randomly deciding a playback order of music so as to play back the music in the order when analysis of the record structure of all the sessions has been completed.

In this way, non-compressed music data of the CD-DA format is read and played back, and meanwhile, the record structure of music data in other sessions is analyzed so as to decide the random playback order. Accordingly, the first song is always a song which is randomly selected from among the CD-DA songs, but the second song and the subsequent songs can be played back in the randomly decided order. Further, random playback can be rapidly started.

According to a third embodiment of the present invention, a method for playing back discs in a disc changer is provided. The method comprises the acts of: (1) checking each disc so as to determine whether the disc contains music data of a CD-DA format and storing the result; (2) loading the disc containing music data of the CD-DA format when random playback is instructed, reading randomly-selected music data from the disc at a high speed so as to write the music data in a shock proof memory, and reading the music data from the shock proof memory at a normal speed so as to play back the music data; (3) suspending reading of the music data from the disc every time the amount of music data in the shock proof memory reaches a first set value until the amount of data reaches a second set value, and meanwhile, analyzing the record structure of music data recorded in each session of other discs so as to store the analysis result; and (4) randomly deciding a playback order of music so as to play back the music in the order when analysis of the record structure of all the sessions of all the discs has been completed.

In this way, non-compressed music data of the CD-DA format is read and is played back first, and meanwhile, the record structure of music data of all the sessions of all the discs is analyzed so as to decide the random playback order. Accordingly, the first song is always a CD-DA song which is randomly selected, but after the record structure has been analyzed, playback can be performed in the randomly decided order from among all the songs in all the discs. Further, random playback can be rapidly started in the disc changer.

BRIEF DESCRIPTION OF THE DRAWINGS

FIG. 10 illustrates TOC in a lead-in area in a CD-DA mode;

FIGS. 13A to 13D show the volume structure of ISO9660; and

DESCRIPTION OF THE PREFERRED EMBODIMENTS (A) First Preferred Embodiment

Figure 1:
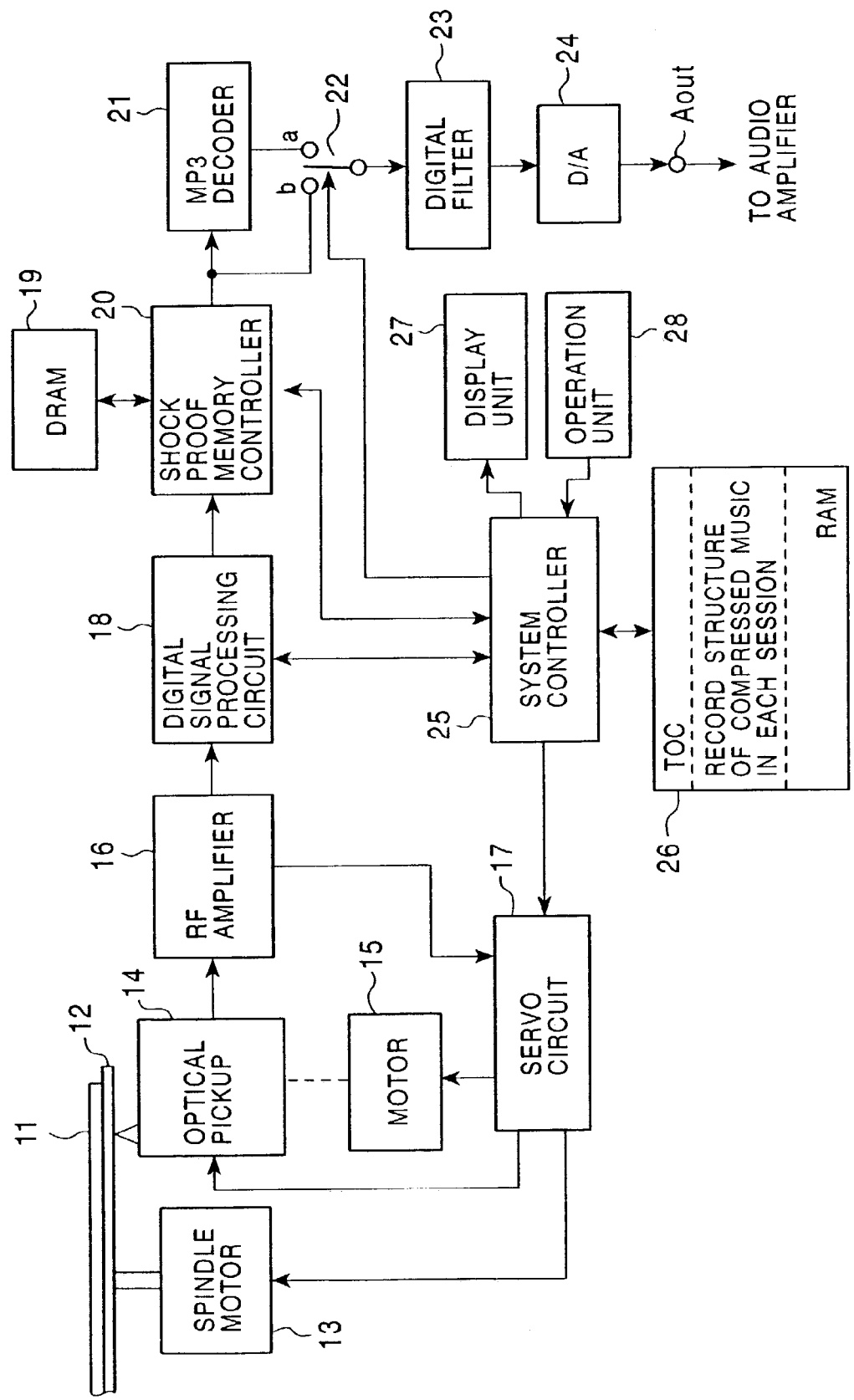
FIG. 1 shows the configuration of a disc player according to an embodiment of the present invention.

FIG. 1 shows the configuration of a disc player. In FIG. 1, the disc player includes a multisession disc 11 such as a CD-R; a turn table 12 on which the disc is loaded; a spindle motor 13 for rotating the disc at a predetermined constant linear velocity; an optical pickup 14 for detecting a digital recording signal of the disc; and a motor 15 for moving the optical pickup 14 in the radius direction of the disc. Also, the disc player includes an RF amplifier 16 for generating an EFM signal, an error signal, a CLV control signal, and so on based on the detection signal generated by the optical pickup 14; and a servo circuit 17 for performing servo-control in response to a command from a system controller 25, which will be described later, by using an error signal (focus-error signal and tracking-error signal), a CLV control signal, and so on. The servo circuit 17 also controls a feed for moving the optical pickup 14 in the radius direction of the disc. Further, the disc player includes a digital signal processing circuit 18 which performs synchronization, deinterleave, and error correction with respect to an EFM signal output from the RF amplifier 16, and which demodulates audio sample data so as to input the data to a shock proof memory controller 20. Also, the digital signal processing circuit 18 demodulates TOC information, sub-code data, a volume descriptor of the ISO9660 format, a path table, and a directory so as to input them to the system controller 25.

The disc player also includes a DRAM (shock proof memory) 19 which temporarily stores non-compressed music data or compressed music data, the data being freely read/written from/in the DRAM 19; and the shock proof memory controller 20 which writes non-compressed music data or compressed music data in the shock proof memory 19 at a high speed and intermittently and which reads the data from the shock proof memory 19 at a high speed and sequentially while performing the writing process. When the shock proof memory 19 is filled with data (when the data amount reaches or surpasses a first set amount), the shock proof memory controller 20 notifies the system controller 25 of that fact, and suspends writing while continuing reading. Then, when a predetermined free space is generated in the shock proof memory 19 by reading out data, that is, when the data amount is reduced to or under a second set amount, the shock proof memory controller 20 notifies the system controller 25 that a free space is generated, and also restarts writing of non-compressed music data or compressed music data which is input from the digital signal processing circuit 18.

Further, the disc player includes an MP3 decoder 21 for decompressing the compressed music data which has been sequentially read from the shock proof memory 19 by the shock proof memory controller 20 so as to generate non-compressed normal music data; a switch 22 which selects and outputs the non-compressed normal music data which has been read from the shock proof memory 19 by the shock proof memory controller 20 or non-compressed normal music data which has been read from the MP3 decoder 21; a digital filter 23 for performing oversampling to the music data input by the switch 22; and a D/A converter 24 which converts the music data input from the digital filter 23 to analog data and which outputs the analog data to an external audio amplifier through an analog output terminal Aout. Further, the disc player includes the system controller 25 for performing analysis of the record structure of music data in each session and playback control of a multisession disc; a RAM 26 for storing TOC information of the CD-DA format and the analysis result of the record structure (file structure) of music data in each session; a display unit 27; and an operation unit 28 including various keys.

(a) Normal Playback Control

Figure 2:
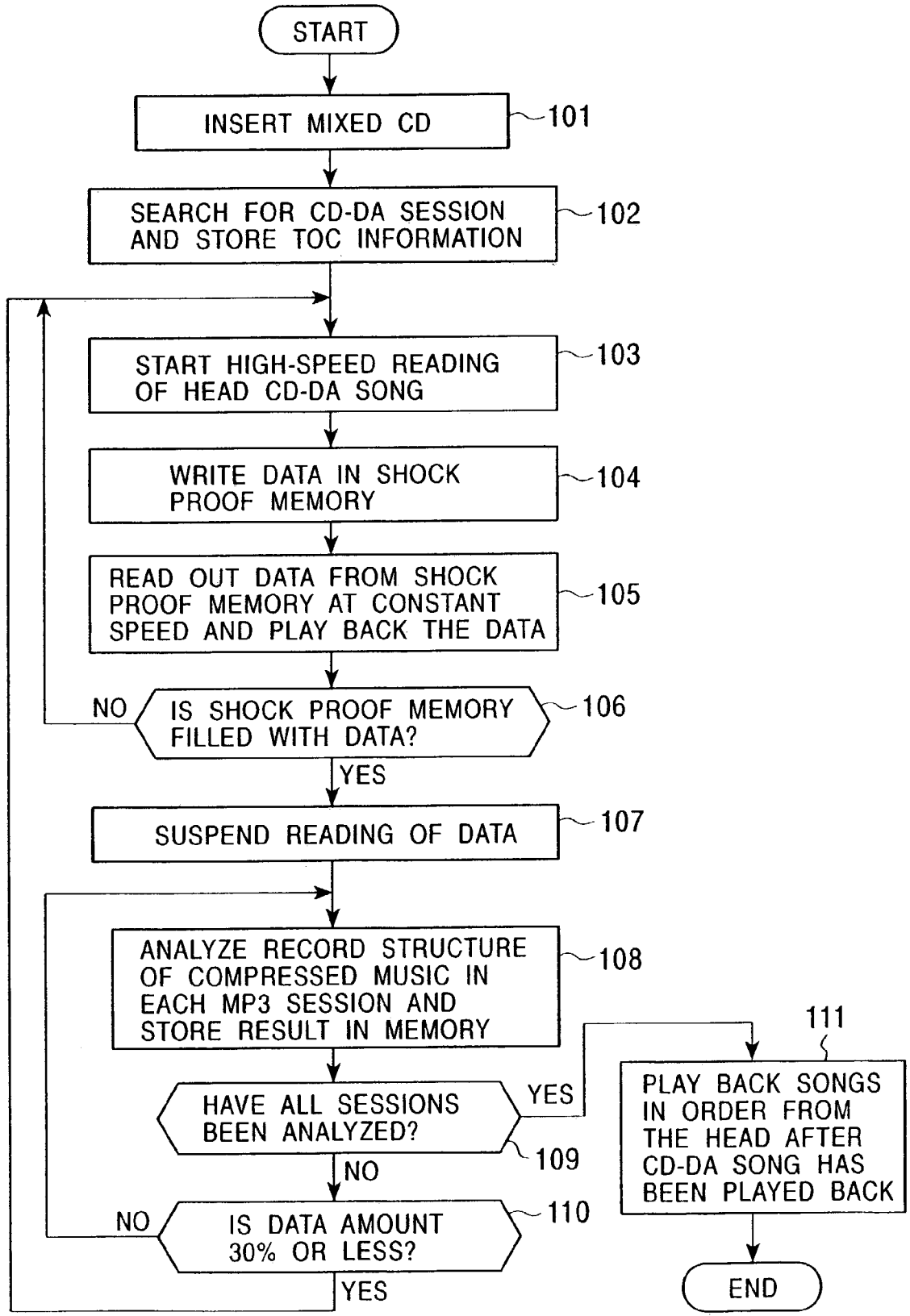
FIG. 2 is a flowchart of a normal playback process of a multisession disc.

FIG. 2 is a flowchart of a normal playback process of a multisession disc.

A multisession disc (mixed disc), in which music data of the CD-DA format (non-compressed music data) is recorded in at least one session and MP3 compressed music data of another format is recorded in another session, is loaded in the player and a playback command is outputted (act 101).

The system controller 25, referring to the second bit of control data of sub-code Q recorded in the lead-in area of each session, searches for a session of the CD-DA format (act 102), and if the session can be found, reads TOC information from the lead-in area of the session and stores it, and then starts high-speed reading of the head CD-DA song (act 103).

The digital signal processing circuit 18 inputs the non-compressed normal music data of the CD-DA format, which has been read at a high speed from the CD, to the shock proof memory controller 20. The shock proof memory controller 20 writes the input music data in the shock proof memory 19 at a high speed (act 104), reads music data from the shock proof memory 19 at a normal speed and inputs the read music data to the DA converter 24 through the switch 22 and the digital filter 23, and the DA converter 24 DA-converts the input digital music data and inputs the data to the audio amplifier so that music is outputted through a speaker (act 105).

The shock proof memory controller 20 checks the amount of data in the shock proof memory 19 (act 106) and continues acts 103 to 106 until the shock proof memory 19 is filled with data. When the shock proof memory 19 is filled with data, that is, when the amount of data reaches or surpasses the first set amount, high-speed reading of music data from the multisession disc 11 is suspended (act 107).

In this state, the system controller 25 moves the pickup 14 to the lead-in area of the last session, analyzes the record structure of music data of all the sessions recorded in the lead-in area, and stores the identifier of the MP3 compressed music recorded in each session and the record position in the RAM 26 (act 108). Also, the system controller 25 checks whether analysis of all the sessions has been completed while analyzing the record structure (act 109). If not completed, the system controller 25 checks whether free space generation has been notified from the shock proof memory controller 20, that is, whether the amount of data in the shock proof memory 19 is at the second set value (30%) or less (act 110). If free space generation is not notified, the process of analyzing the record structure in act 108 is continued. On the other hand, if free space generation is notified, the process of analyzing the record structure is stopped, high-speed reading of the CD-DA song is restarted (act 103), and subsequent steps are performed.

If the above-described steps continue so that analysis of the record structure of music data of all the sessions is finally completed in act 109, the songs in the disc are played back in order from the head after the CD-DA song which is now being played back has been completed (act 111). In this case, the CD-DA song which has already been played back may or may not be played back. Also, when time is required for analyzing the record structure of all the sessions so that a CD-DA song has been played back during that time, the next CD-DA song is played back.

In this way, non-compressed music data of the CD-DA format is read and is played back first, and meanwhile, the record structure of music data in other sessions is analyzed. Accordingly, the first song is always a CD-DA song, but playback can be rapidly started.

(b) Playback Control According To Playback Mode

Figure 3:
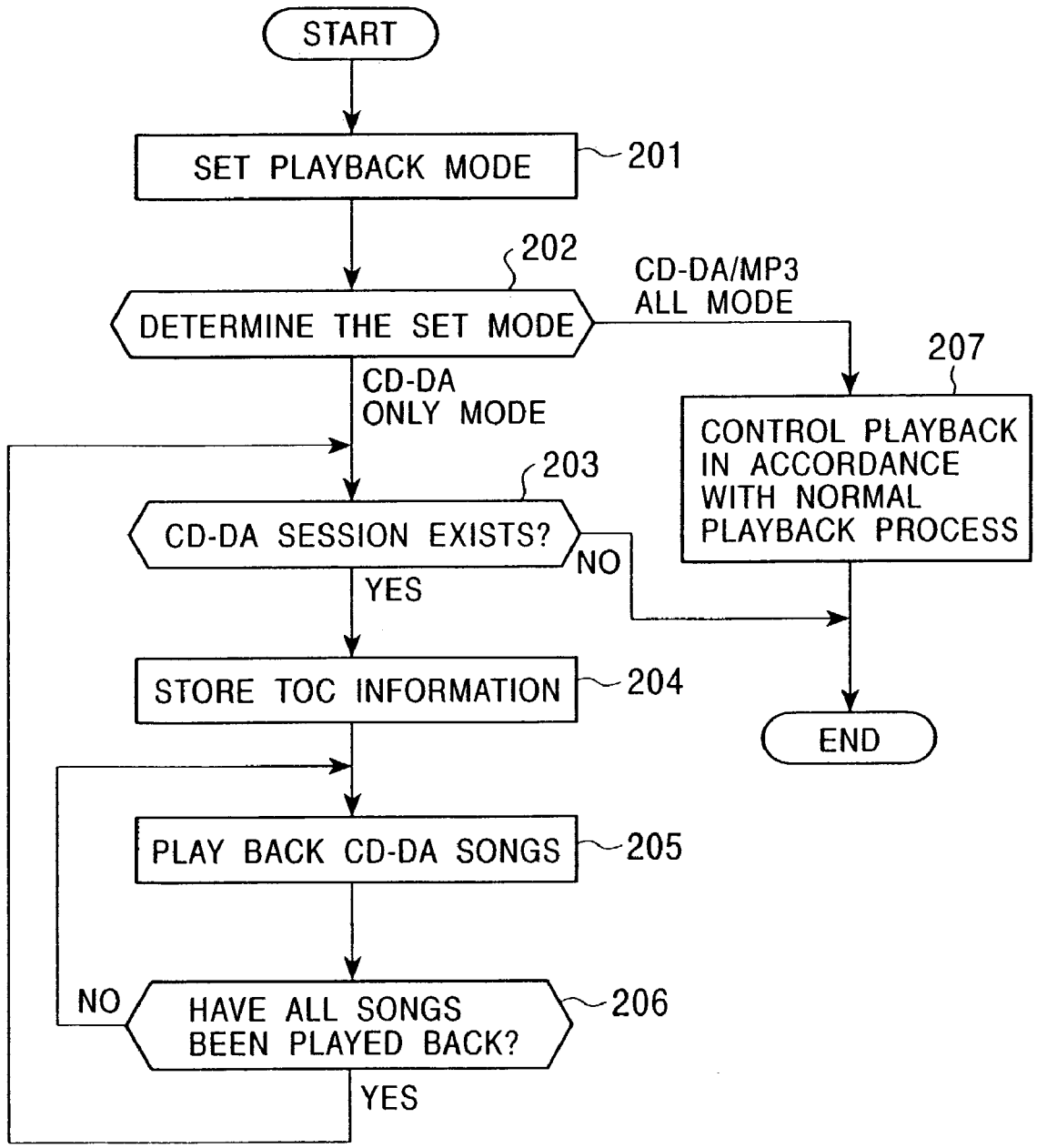
FIG. 3 is a flowchart of a playback process using a mode in which only CD-DA format music is played back and a mode in which all songs are played back.

FIG. 3 is a flowchart of a playback process in which a first playback mode for playing back only non-compressed music of the CD-DA format and a second playback mode for playing back both of non-compressed music and compressed music are provided.

First, a playback mode is set by using the operation unit 28 (act 201). When the playback mode is set, the system controller 25 determines whether the set playback mode is the first playback mode (CD-DA only mode) or the second playback mode (CD-DA/MP3 all mode) in act 202.

If the first playback mode (CD-DA only mode) is set, the system controller 25 refers to the second bit of the control data of the sub-code Q which is recorded in the lead-in area of each session so as to check whether a session of the CD-DA format exists (act 203). If a session of the CD-DA format can be found, TOC information is read from the lead-in area of the session and stored (act 204), and playback is started in order from the head CD-DA song (act 205). Then, it is determined whether all songs in the session of the CD-DA format have been played back (act 206). Playback of act 205 is continued until all songs have been played back. When all songs have been played back, the process returns to act 203, where another CD-DA format session is searched for. If another session of the CD-DA format exists, the acts 204 to 206 are performed. On the other hand, if a session of the CD-DA format does not exist any more, playback in the first playback mode is completed.

On the other hand, if it is determined that the second playback mode (CD-DA/MP3 all mode) is set in act 202, playback control is performed in accordance with act 102 and the subsequent steps of normal playback shown in FIG. 2 (act 207).

In this way, a user can select playback of only CD-DA songs or playback of all songs. In any case, music can be output quickly.

(c) Random Playback

Figure 4:
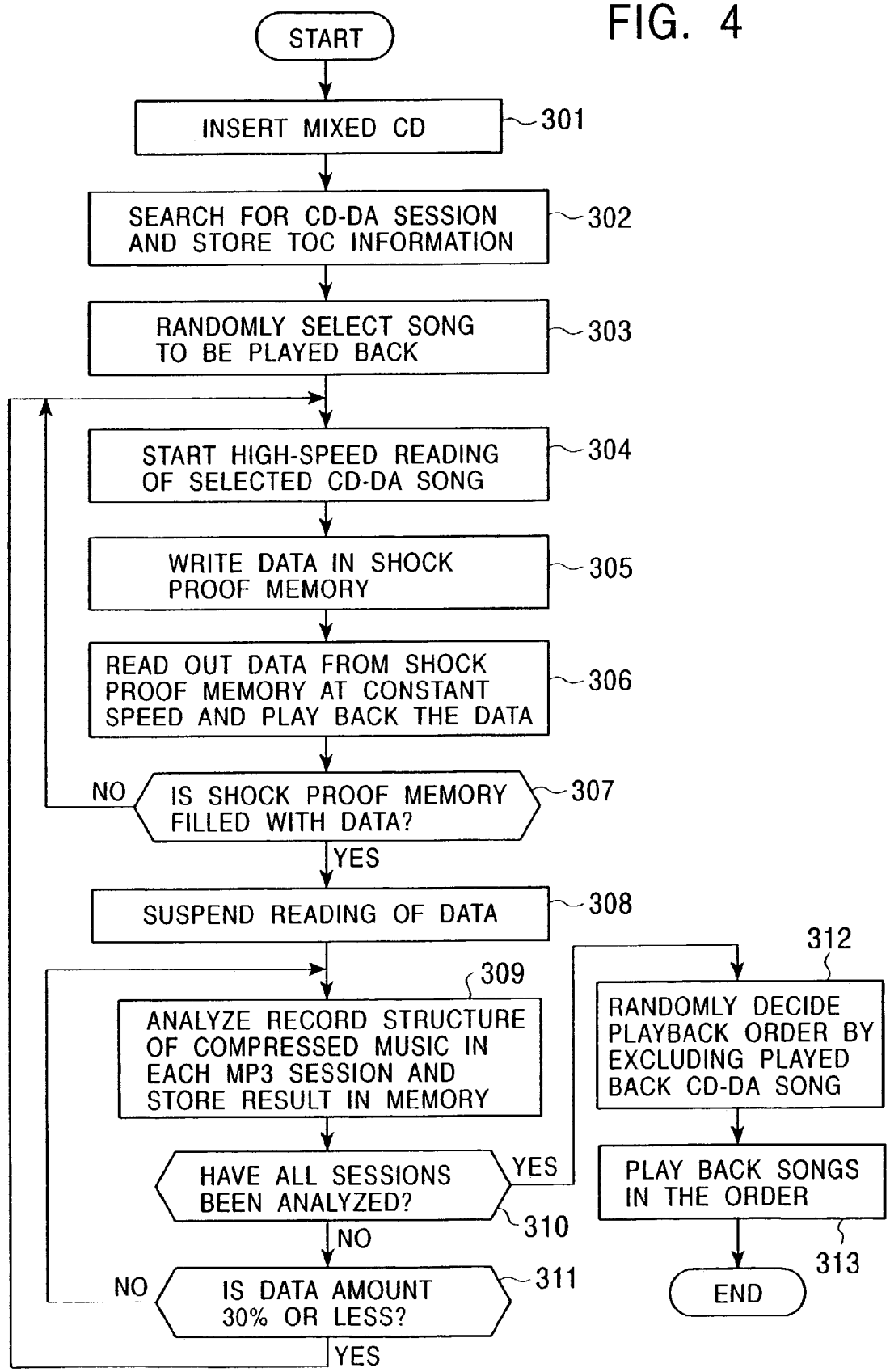
FIG. 4 is a flowchart of a random playback process.

FIG. 4 is a flowchart of a random playback process.

A multisession disc (mixed disc), in which music data of the CD-DA format (non-compressed music data) is recorded in at least one session and MP3 compressed music data of another format is recorded in another session, is loaded in the player and a random playback command is output (act 301).

The system controller 25 refers to the second bit of control data of sub-code Q recorded in the lead-in area of each session, searches for a session of the CD-DA format (act 302), and if the session can be found, reads TOC information from the lead-in area of the session and stores it, randomly selects a song to be played back from among the CD-DA songs (act 303), and then starts high-speed reading of the song to be played back (act 304).

The digital signal processing circuit 18 inputs the non-compressed normal music data of the CD-DA format, which has been read at a high speed from the CD, to the shock proof memory controller 20. The shock proof memory controller 20 writes the input music data in the shock proof memory 19 at a high speed (act 305), reads music data from the shock proof memory 19 at a normal speed and inputs the read music data to the DA converter 24 through the switch 22 and the digital filter 23, and the DA converter 24 DA-converts the input digital music data and inputs the data to the audio amplifier so that music is output through the speaker (act 306).

The shock proof memory controller 20 checks the amount of data in the shock proof memory 19 (act 307) and continues the acts 304 to 307 until the shock proof memory 19 is filled with data. When the shock proof memory 19 is filled with data, i.e., when the amount of data reaches or surpasses the first set amount, high-speed reading of music data from the multisession disc 11 is suspended (act 308).

In this state, the system controller 25 moves the pickup 14 to the lead-in area of the last session, analyzes the record structure of music data of all the sessions recorded in the lead-in area, and stores the identifier of the MP3 compressed music recorded in each session and the record position in the RAM 26 (act 309). Also, the system controller 25 checks whether analysis of all the sessions has been completed while analyzing the record structure (act 310). If not completed, the system controller 25 checks whether free space generation has been notified from the shock proof memory controller 20, i.e., whether the amount of data in the shock proof memory 19 is at the second set value (30%) or less (act 311). If free space generation is not notified, the process of analyzing the record structure in act 309 is continued. On the other hand, if free space generation is notified, the process of analyzing the record structure is stopped, high-speed reading of the CD-DA song is restarted (act 304), and subsequent acts are performed.

If the above-described acts continue so that analysis of the record structure of music data of all the sessions is finally completed in step 310, the playback order of all the songs except the CD-DA song which is now being played back is randomly decided (act 312), and random playback is performed in accordance with the decided order (act 313). In this case, the random playback order may be decided by excluding or including the CD-DA song which has already been played back. Also, when time is required for analyzing the record structure of all the sessions so that the CD-DA song has been played back during that time, the next CD-DA song, which has been randomly selected, is played back.

In this way, non-compressed music data of the CD-DA format is read and is played back, and meanwhile, the record structure of music data in other sessions is analyzed so as to decide the random playback order. Accordingly, the first song is always a song which is randomly selected from among the CD-DA songs, but the second song and the subsequent songs can be played back in the randomly decided order. Further, random playback can be rapidly started.

(B) Second Embodiment

Figure 5:
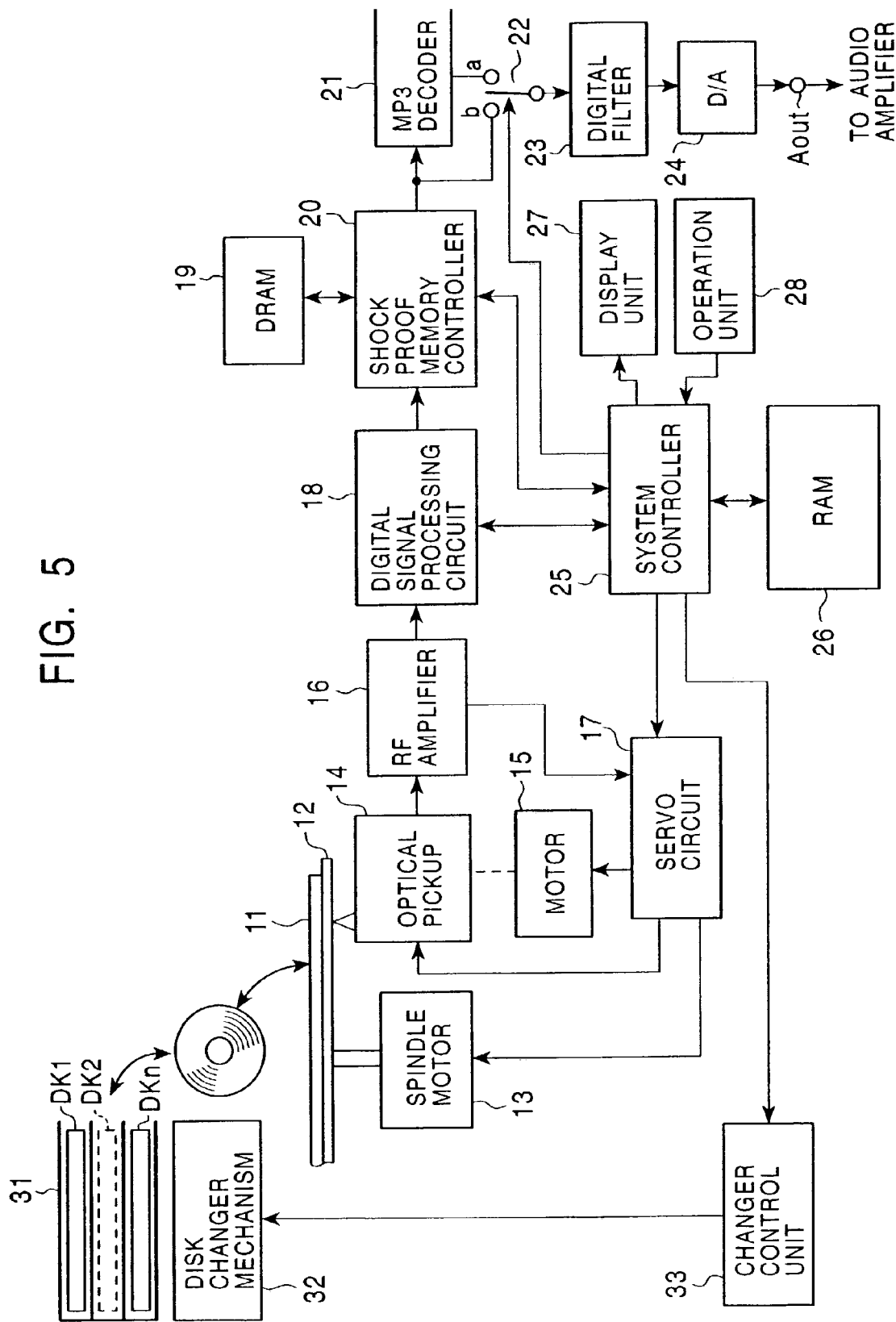
FIG. 5 shows the configuration of a CD changer according to another embodiment of the present invention.

FIG. 5 is the configuration of a CD changer according to a second preferred embodiment of the present invention. In FIG. 5, elements which are the same as in FIG. 1 are denoted by the same reference numerals. A different point from the first embodiment is that the following elements are provided: a magazine 31 for accommodating a plurality of discs DK1 to DKn; a disc changer mechanism 32 for changing discs; and a changer control unit 33 for controlling the disc changer mechanism 32 in accordance with the instructions from the system controller 25.

Figure 6:
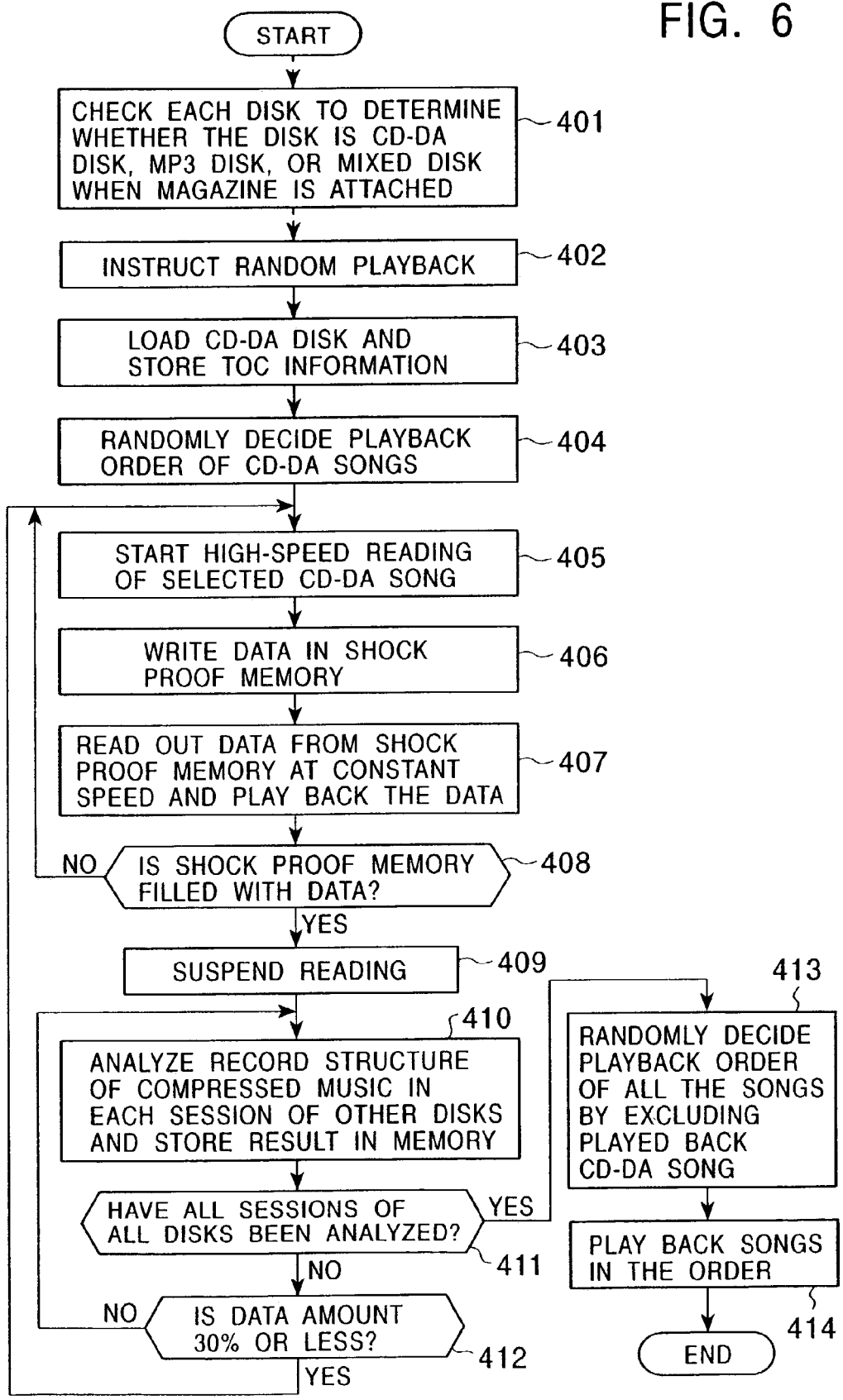
FIG. 6 is a flowchart of a random playback process in the CD changer.
Figure 7:
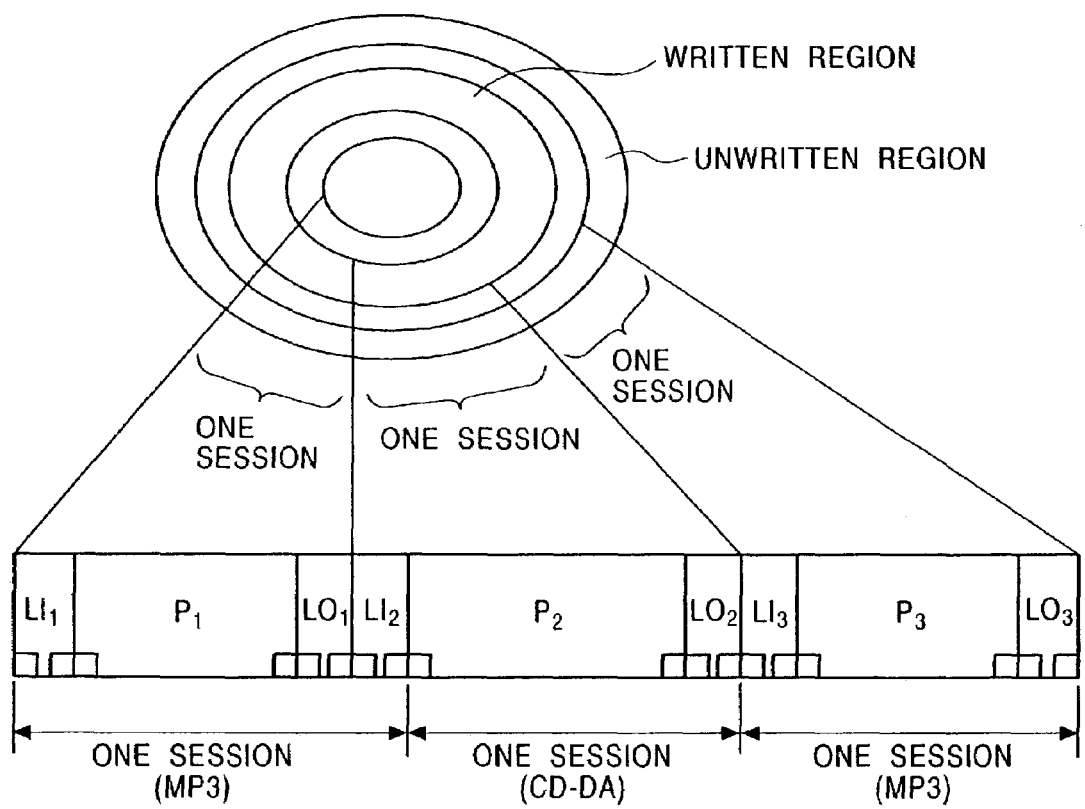
FIG. 7 illustrates a multisession disc.
Figure 8:
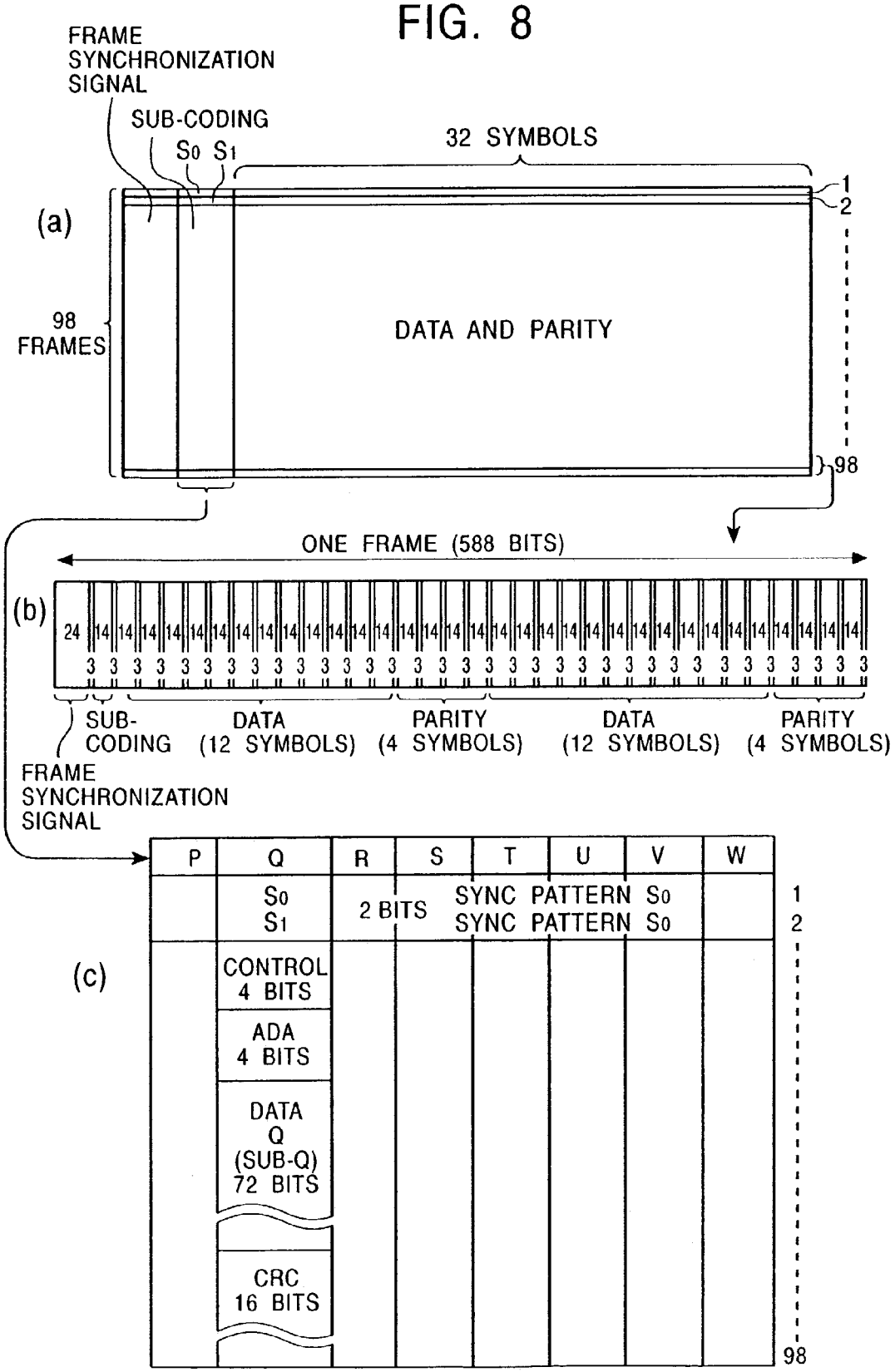
FIG. 8 illustrates a CD-DA signal format.
Figure 9:
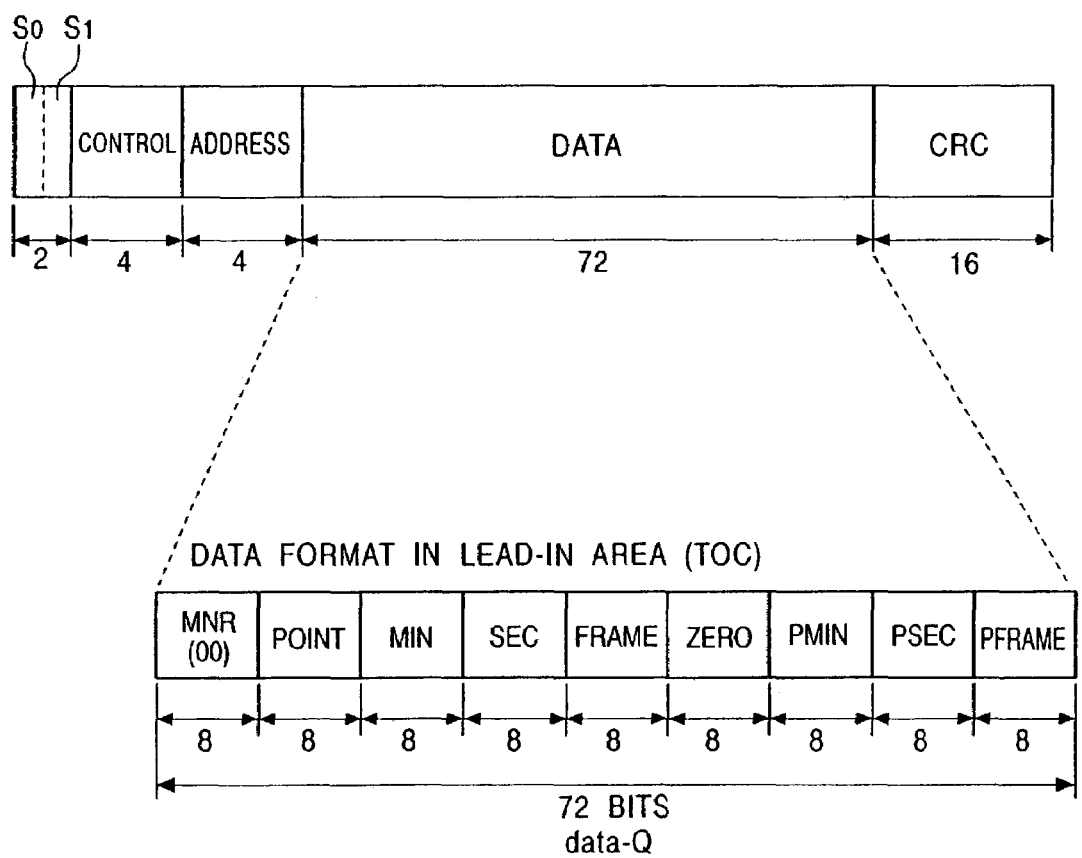
FIG. 9 illustrates a sub-code Q.
Figure 11:
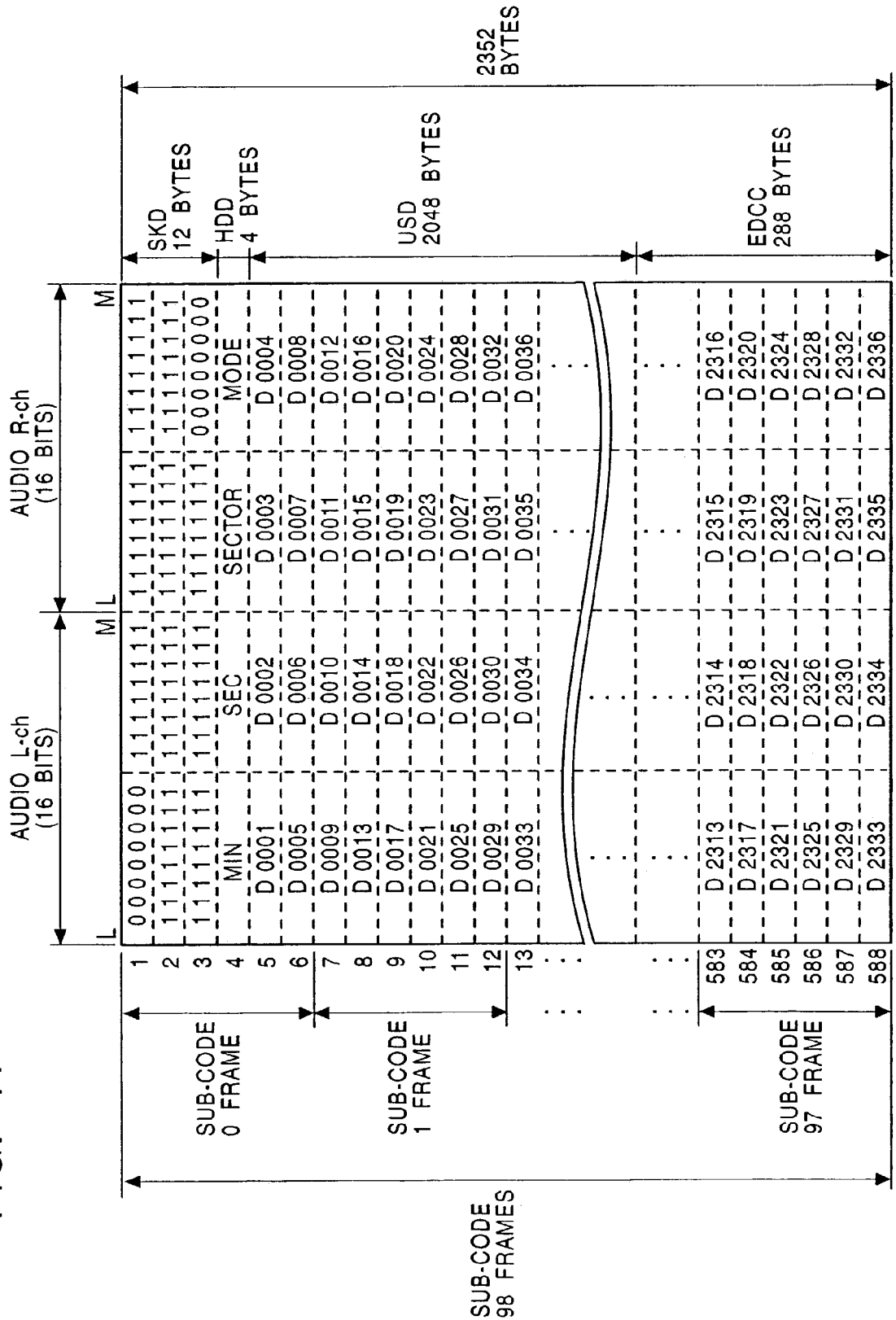
FIG. 11 shows the structure of one sector in a CD-ROM mode 1.
Figure 12:
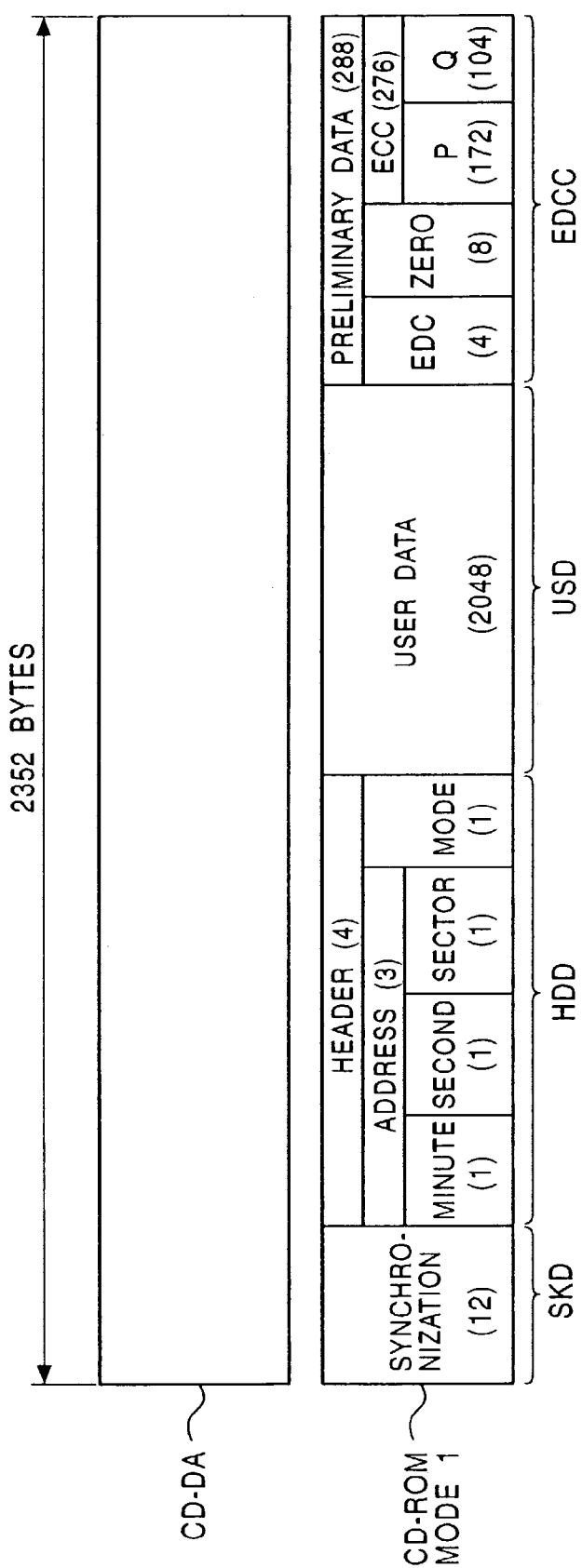
FIG. 12 is a comparative diagram of one sector of the CD-DA and one sector of the CD-ROM.
Figure 13C:
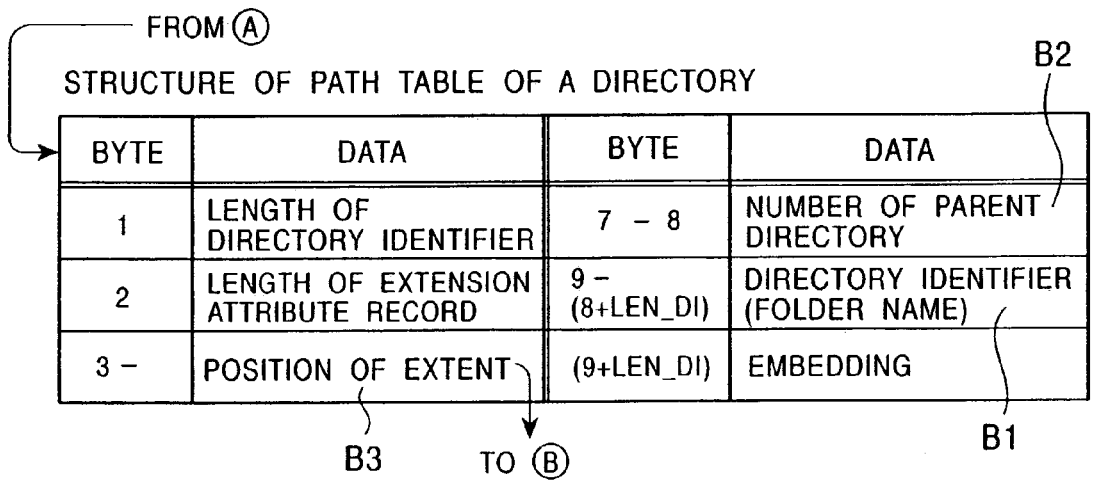
Figure 13D:
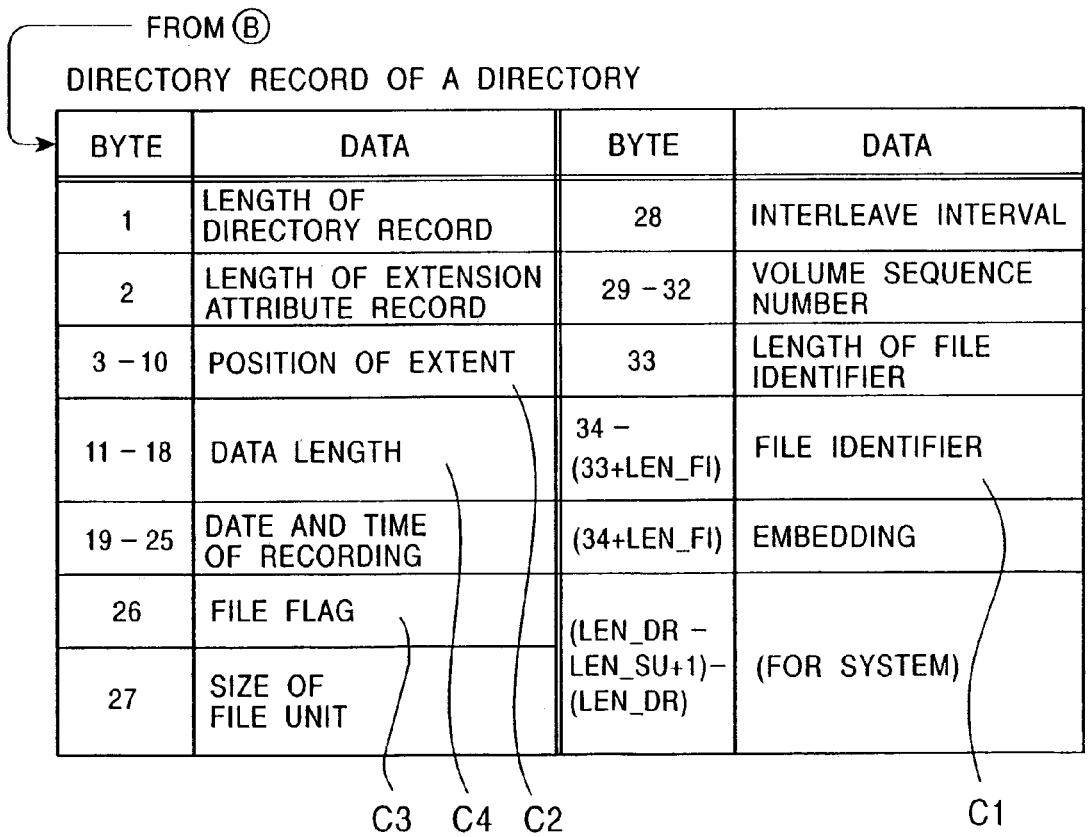
Figure 14:
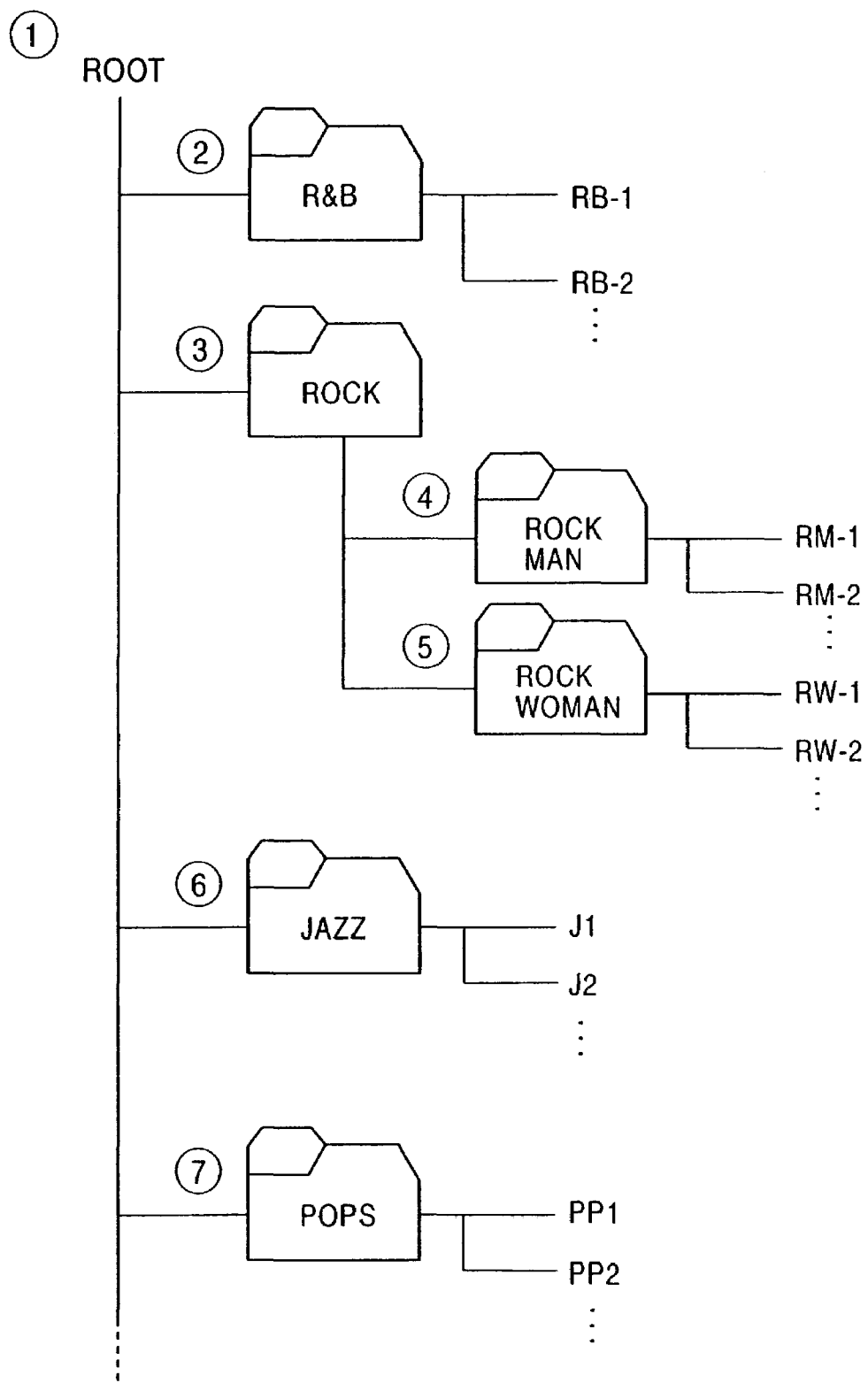
FIG. 14 shows an example of the structure of a file.

FIG. 6 is a flowchart of a random playback process in the CD changer.

When the magazine 31 is attached, the system controller 25 automatically checks each disc so as to determine whether the disc is a CD-DA disc in which only music data of the CD-DA format is recorded, an MP3 disc in which only MP3 compressed music is recorded, or a multisession mixed disc in which music data of the CD-DA format is recorded in at least one session and MP3 compressed music is recorded in another session, and stores the result in the RAM 26 of a battery backup (act 401).

In this state, when random playback is instructed (act 402), the system controller 25 searches for a CD-DA disc based on the above-mentioned storage information. If a CD-DA disc exists, the system controller 25 loads the CD-DA disc. If a CD-DA disc does not exist, a mixed disc is loaded. Then, the system controller 25 reads TOC information and stores it in the RAM 26 (act 403).

Then, the playback order of the CD-DA songs is randomly decided (act 404) and high-speed reading of the songs to be played back is started (act 405). The digital signal processing circuit 18 inputs the non-compressed normal music data of the CD-DA format, which has been read from the CD at a high speed, to the shock proof memory controller 20. The shock proof memory controller 20 writes the input music data to the shock proof memory 19 at a high speed (act 406), and at the same time, it reads music data from the shock proof memory 19 at a normal speed and inputs the data to the DA converter 24 through the switch 22 and the digital filter 23. The DA converter 24 DA-converts the input digital music data so as to input the converted data to the audio amplifier. Accordingly, music is outputted through the speaker (act 407).

The shock proof memory controller 20 checks the amount of data in the shock proof memory 19 (act 408) and continues acts 405 to 408 until the shock proof memory 19 is filled with data. When the shock proof memory 19 is filled with data, that is, when the amount of data reaches or surpasses the first set amount, high-speed reading of music data from the disc is suspended (act 409).

In this state, the system controller 25 loads another disc, moves the pickup 14 to the lead-in area of the last session, analyzes the record structure of music data of all the sessions recorded in the lead-in area, and stores the identifier of the songs recorded in each session and the record position in the RAM 26 (act 410). Also, the system controller 25 checks whether analysis of the record structure of music data in all the sessions of all the discs has been completed while analyzing the record structure (act 411). If not completed, the system controller 25 checks whether free space generation has been notified from the shock proof memory controller 20, i.e., whether the amount of data in the shock proof memory 19 is at the second set value (30%) or less (act 412). If free space generation is not notified, the process of analyzing the record structure in act 410 is continued. On the other hand, if free space generation is notified, the process of analyzing the record structure is stopped, high-speed reading of the CD-DA song is restarted (act 405), and subsequent acts are performed.

If the above-described acts continue so that analysis of the record structure of music data of all the sessions of all the discs is finally completed in act 411, the playback order of all the songs except the CD-DA song which is now being played back is randomly decided (act 413), and random playback is performed in accordance with the decided order (act 414). In this case, the random playback order may be decided by including the CD-DA song which has already been played back. Also, when time is required for analyzing the record structure of all the sessions of all the discs so that the first CD-DA song has been played back during that time, the next CD-DA song, which has been randomly selected, is played back.

According to the preferred embodiments, music data of the CD-DA format is read and is played back first, and meanwhile, the record structure of music data in other sessions is analyzed. Therefore, the first song is always a CD-DA song, but playback can be rapidly started.

Also, according to the preferred embodiments, music data of the CD-DA format is read and is played back first, and meanwhile, the record structure of music data in other sessions is analyzed so as to decide the random playback order. Accordingly, the first song is always a song which is randomly selected from among the CD-DA songs, but the second song and the subsequent songs can be played back in the randomly decided order. Further, random playback can be rapidly started.

Further, according to the preferred embodiments, music data of the CD-DA format is read and is played back first, and meanwhile, the record structure of music data of all the sessions of all the discs is analyzed so as to decide the random playback order. Accordingly, the first song is a CD-DA song which is randomly selected, but after the record structure has been analyzed, playback can be performed in the randomly decided order from among all the songs in all the discs. Further, random playback can be rapidly started in the disc changer.

What is claimed is:

1. A method for playing back a multisession disc in which music data of a CD-DA format is recorded in at least one session and compressed music data of another format is recorded in another session, the method comprising the acts of:

searching for a session in which music data of the CD-DA format is recorded;

reading the music data in the session from the disc at a speed greater than a normal speed;

writing the music data in a shock proof memory;

reading the music data from the shock proof memory at the normal speed;

suspending reading of the music data from the disc when the amount of music data in the shock proof memory reaches a first set value until the amount of data reaches a second set value;

analyzing the record structure of compressed music data recorded in other sessions after writing at least a portion of the music data of the CD-DA format in the shock proof memory; and playing back music in order based on an analysis of the record structure of all the sessions.

2. The method of claim 1, further comprising the acts of:

providing a first playback mode for playing back only music of the CD-DA format and a second playback mode for playing back all songs including compressed music; and searching for a session in which music data of the CD-DA format is recorded so as to play back the music in the session when the first playback mode is set.

3. The method of claim 2, wherein the format of compressed music data is MP3, ATRAC3, AAC, WMA or AC3.

4. A playback apparatus operable to play back a multisession disc in which music data of a CD-DA format is recorded in at least one session and compressed music data of another format is recorded in another session, the apparatus comprising:

a CD-DA search unit operable to search for a session in which music data of the CD-DA format is recorded when the multisession disc is played back;

a reading unit operable to read the music data in the session from the disc at a high speed;

a data storage unit operable to store the music data which has been read by the reading unit;

a playback unit operable to read the music data from the data storage unit at a normal speed and which plays back the music data;

a music data amount check unit operable to suspend reading of the music data from the disc every time the amount of music data in the data storage unit reaches a first set value until the amount of data reaches a second set value; and a record structure analyzing unit operable to analyze the record structure of compressed music data recorded in other sessions and store the analysis result after storing at least a portion of the music data of the CD-DA format in the data storage unit, wherein the playback unit plays back music in order based on the stored data when the record structure analyzing unit has completed an analysis of the record structure of all the sessions.

5. The playback apparatus of claim 4, further comprising a playback-mode setting unit operable to set a first playback mode for playing back only music of the CD-DA format and a second playback mode for playing back all songs including compressed music.

6. The playback apparatus of claim 5, wherein the format of compressed music data is MP3, ATRAC3, AAC, WMA or AC3.

7. A method for playing back a multisession disc in which music data of a CD-DA format is recorded in at least one session and compressed music data of another format is recorded in another session, the method comprising the acts of:

searching for a session in which music data of the CD-DA format is recorded when random playback is instructed;

reading the music data in the session from the disc at a speed greater than a normal speed;

writing the music data in a shock proof memory;

reading the music data from the shock proof memory at the normal speed;

suspending reading of the music data from the disc every time the amount of music data in the shock proof memory reaches a first set value until the amount of data reaches a second set values;

analyzing the record structure of compressed music data recorded in other sessions;

randomly deciding a playback order of music; and playing back the music in a playback order when analysis of the record structure of all the sessions has been completed.

8. The method according to claim 7, wherein the format of compressed music data is MP3, ATRAC3, AAC, WMA or AC3.

9. A method for playing back discs in a disc changer, wherein at least one of the discs is a multisession disc comprising compressed music data, the method comprising the acts of:

checking each disc in the disc changer to determine whether each disc contains music data of a CD-DA format and storing the result;

loading a disc containing music data of the CD-DA format when random playback is instructed;

reading randomly-selected music data from the disc at a speed greater than a normal speed;

writing the music data in a shock proof memory;

reading the music data from the shock proof memory at the normal speed;

suspending reading of the music data from the disc every time the amount of music data in the shock proof memory reaches a first set value until the amount of data reaches a second set value;

analyzing the record structure of music data recorded in each session of the other discs in the disc changer after writing at least a portion of the music data of the CD-DA format of the disc to the shock proof memory, wherein analyzing the record structure of music data recorded in each session of the other discs in the disc changer comprises analyzing the record structure of the compressed music data of at least one multisession disc;

randomly deciding a playback order of music; and playing back the music in the playback order when analysis of the record structure of all the sessions of all the discs has been completed.

10. An apparatus for playing back a multisession disc in which music data of a CD-DA format is recorded in at least one session and compressed music data of another format is recorded in another session, the apparatus comprising:

a playback instructing unit operable to instruct random playback;

a CD-DA search unit operable to search for a session in which music data of the CD-DA format is recorded when the playback instructing unit instructs random playback;

a reading unit operable to read the music data in the session, which has been searched for by the CD-DA search unit, from the disc at a speed greater than a normal speed;

a data storage unit operable to store the music data which has been read by the reading unit;

a playback unit operable to read the music data from the data storage unit at the normal speed and which plays back the music data;

a music data amount check unit operable to suspend reading of the music data from the disc every time the amount of music data in the data storage unit reaches a first set value until the amount of data reaches a second set value; and a record structure analyzing unit operable to analyze the record structure of compressed music data recorded in other sessions of the disc after the data storage unit stores the music data of the CD-DA format read by the reading unit, wherein the playback unit randomly decides the playback order of music and plays back the music in the order when the record structure analyzing unit has completed analysis of the record structure of all the sessions.

11. The apparatus according to claim 10, wherein the format of compressed music data is MP3, ATRAC3, AAC, WMA or AC3.

12. A disc changer playback apparatus for playing back discs in the disc changer apparatus, wherein at least one of the discs is a multisession disc comprising compressed music data, comprising:

a disc check unit operable to determine whether each disc in the disc changer contains music data of a CD-DA format;

a storage unit operable to store a result obtained by the disc check unit;

a playback instructing unit operable to instruct random playback in which the playback order is random;

a disc loading unit operable to load a disc containing music data of the CD-DA format by using the check result stored in the storage unit when the playback instructing unit instructs random playback;

a reading unit operable to read the music data which has been randomly selected from the disc loaded by the disc loading unit at a speed greater than a normal speed;

a music data storage unit operable to store the music data which has been read by the reading unit;

a playback unit operable to read the music data from the music data storage unit at the normal speed and which plays back the music data;

a music data amount check unit operable to suspend reading of the music data from the disc every time the amount of music data in the music data storage unit reaches a first set value until the amount of data reaches a second set value; and a record structure analyzing unit operable to analyze the record structure of the music data recorded in each session of the other discs in the disc changer so as to store the analysis result after the music data storage unit stores at least a portion of the music data of the CD-DA format, wherein analyzing the record structure comprises analyzing the record structure of the compressed music data of the at least one multisession disc, wherein the playback unit randomly decides the playback order of music and plays back the music in the order when the record structure analyzing unit has completed analysis of the record structure of all the sessions of all the discs.

* * * * *